United States Patent
Allias et al.

(10) Patent No.: US 12,534,215 B2
(45) Date of Patent: Jan. 27, 2026

(54) PROPULSION UNIT COMPRISING AT LEAST ONE ELECTRIC MOTOR AND A COUPLING SYSTEM POSITIONED ON EITHER SIDE OF A TRANSMISSION SYSTEM

(71) Applicant: Airbus Operations SAS, Toulouse (FR)

(72) Inventors: Jean-François Allias, Toulouse (FR); Rémi Amargier, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/779,955

(22) Filed: Jul. 22, 2024

(65) Prior Publication Data
US 2025/0033787 A1    Jan. 30, 2025

(30) Foreign Application Priority Data
Jul. 24, 2023    (FR) ...................................... 2307920

(51) Int. Cl.
| | | |
|---|---|---|
| *B64D 35/021* | (2024.01) | |
| *B64D 27/34* | (2024.01) | |
| *B64D 35/08* | (2025.01) | |

(52) U.S. Cl.
CPC ........... B64D 35/021 (2024.01); B64D 27/34 (2024.01); B64D 35/08 (2013.01)

(58) Field of Classification Search
CPC .... B64D 35/02; B64D 35/021; B64D 35/025; B64D 35/08; B64D 27/24; B64D 27/30; B64C 11/44
See application file for complete search history.

(56) References Cited

U.S. PATENT DOCUMENTS

| | | | |
|---|---|---|---|
| 11,530,033 B2 * | 12/2022 | Preisser | B64D 35/021 |
| 11,565,803 B2 * | 1/2023 | Heironimus | H02K 7/116 |
| 2023/0017954 A1 | 1/2023 | Allias et al. | |
| 2023/0021085 A1 | 1/2023 | Allias et al. | |
| 2024/0043134 A1 | 2/2024 | Raucoules et al. | |

FOREIGN PATENT DOCUMENTS

WO    2022171945 A1    8/2022

OTHER PUBLICATIONS

French Search Report for corresponding French Patent Application No. 2307920 dated Feb. 9, 2024.

* cited by examiner

*Primary Examiner* — Nicholas McFall
*Assistant Examiner* — Justin Michael Heston
(74) *Attorney, Agent, or Firm* — Greer, Burns & Crain, Ltd.

(57) ABSTRACT

A propulsion unit comprising a propulsion system, at least one electric motor positioned in a first external zone, a transmission system, a coupling device which comprises: a first coupling shaft coupled to an output of the electric motor, passing through the transmission system and having a first end protruding into a second external zone; a second coupling shaft coupled to an input of the transmission system, passing through at least one wall of the transmission system and having a first end protruding into the second external zone; and a coupling system configured to couple the first ends of the first and second coupling shafts in terms of rotation and which is positioned in the second external zone. Also an aircraft having at least one such propulsion unit.

12 Claims, 2 Drawing Sheets

PROPULSION UNIT COMPRISING AT LEAST ONE ELECTRIC MOTOR AND A COUPLING SYSTEM POSITIONED ON EITHER SIDE OF A TRANSMISSION SYSTEM

CROSS-REFERENCES TO RELATED APPLICATIONS

This application claims the benefit of French Patent Application Number 2307920 filed on Jul. 24, 2023, the entire disclosure of which is incorporated herein by way of reference.

FIELD OF THE INVENTION

The present application relates to a propulsion unit comprising at least one electric motor and a coupling system positioned on either side of a transmission system, in addition to an aircraft comprising at least one such propulsion unit.

BACKGROUND OF THE INVENTION

According to one embodiment which can be seen in FIG. 1, an aircraft 10 comprises a fuselage 12, at least one wing 14 which is connected to the fuselage 12, in addition to propulsion units 16 which are connected to the wing 14 and arranged on either side of the fuselage 12. As illustrated in FIGS. 2 and 3, each propulsion unit 16 comprises a propeller 18 which has an axis of rotation A18.

For the remainder of the description, a longitudinal direction is parallel to the axis of rotation A18 of the propeller 18. The terms "front" and "rear" refer to the direction of the flow of air relative to the aircraft in flight, the air flowing in the longitudinal direction from upstream to downstream.

A propulsion unit of the electrical type comprises a plurality of electric motors 20, in addition to a transmission system 22, such as a gear box for example, which is configured to couple the electric motors 20 to the propeller 18.

As illustrated in FIG. 3, the transmission system 22 comprises a first housing 24 which has in the longitudinal direction a front wall F24 which is oriented toward the propeller 18 and a rear wall F24' to which the electric motors 20 are fixed, in addition to at least one kinematic chain 26 which is positioned in the first housing 24 and which has at least one input 28 for each electric motor 20 and an output 30 in the form of an output shaft which passes through the front wall F24 in order to be coupled to the propeller 18.

Each electric motor 20 has a second housing 32 which comprises a bearing face F32 which is fixed to the rear wall F24' of the first housing 24, in addition to an output shaft 34 which protrudes relative to the bearing face F32 and which passes through the rear wall F24' of the first housing 24. This output shaft 34 is coupled to one of the inputs 28 of the kinematic chain 26 of the transmission system 22 by a coupling system 36 which is positioned in the first housing 24 of the transmission system 22.

According to one embodiment, each coupling system 36 comprises a freewheel which is configured to adopt a coupled state in which the output shaft 34 of the corresponding electric motor 20 is coupled in terms of rotation and transmits a rotational movement to the kinematic chain 26 of the transmission system 22, in addition to an uncoupled state, in the case of a malfunction for example, in which the output shaft 34 of the corresponding electric motor 20 is no longer coupled to the kinematic chain 26 of the transmission system 22 and no longer transmits any rotational movement thereto.

In this manner, if an electric motor 20 no longer functions and the output shaft 34 thereof is blocked in terms of rotation, the coupling system 36 makes it possible to isolate the kinematic chain 26, which remains operational and transmits the rotational movements of the other electric motors 20 to the propeller 18.

The coupling systems 36 require more frequent maintenance operations than the other elements of the transmission system 22. For each maintenance operation, the transmission system 22 has to be removed, which involves dismantling the electric motors 20, and its housing 24 has to be opened in order to access the coupling systems 36. These different steps are relatively long, awkward and costly.

SUMMARY OF THE INVENTION

The present invention aims to remedy all or some of the drawbacks of the prior art. To this end, the subject of the invention is a propulsion unit comprising a propulsion system, at least one electric motor, in addition to a transmission system which is coupled to the propulsion system, the transmission system comprising first and second transverse walls which delimit an internal zone which is located between the first and second transverse walls, a first external zone which is separated from the internal zone by the first transverse wall, in addition to a second external zone which is separated from the internal zone by the second transverse wall, the electric motor being connected to the first transverse wall and being positioned in the first external zone, and said electric motor having an output which is coupled by a coupling device to an input of the transmission system which is positioned in the internal zone.

According to the invention, the coupling device comprises:
  a first coupling shaft which is coupled to the output of the electric motor, passing through the transmission system and having a first end protruding into the second external zone,
  a second coupling shaft which is coupled to the input of the transmission system, passing through at least the second transverse wall and having a first end protruding into the second external zone,
  a coupling system which is configured to couple the first ends of the first and second coupling shafts in terms of rotation and which is positioned in the second external zone.

According to the invention, the coupling system is positioned outside the transmission system. As a result, it is no longer necessary to remove the transmission system and to dismantle it in order to carry out a maintenance operation of the coupling system, which enables the length of time between two maintenance operations of the transmission system to be increased. It is possible to obtain a more compact unit by arranging the electric motor and the coupling system, which is associated therewith, on either side of the transmission system.

According to a further feature, the second coupling shaft is hollow and is configured to house the first coupling shaft.

According to a further feature, the first and second coupling shafts are coaxial.

According to a further feature, the coupling system is positioned inside the second coupling shaft.

According to a further feature, the coupling device comprises a plug which is configured to seal the first end of the second coupling shaft and which is connected by a releasable connection to the second coupling shaft.

According to a first embodiment, the electric motor comprises an output shaft passing through the transmission system, the output shaft and the first coupling shaft of the coupling device forming one and the same shaft.

According to a second embodiment, the electric motor comprises an output shaft which is positioned in the first external zone. In addition, the first coupling shaft of the coupling device and the output shaft of the electric motor are two separate shafts, the first coupling shaft comprising a second end which is positioned in the first external zone and which is coupled to the output shaft of the electric motor.

According to a further feature, the second coupling shaft comprises a second end which cooperates with the first transverse wall. In addition, the propulsion unit comprises a pivoting connection comprising a first rotating guide which is interposed between a portion of the second coupling shaft and the second transverse wall, in addition to a second rotating guide which is interposed between the second end of the second coupling shaft and the first transverse wall.

According to a further feature, the propulsion system is positioned in the second external zone.

According to a further feature, the coupling system is able to be disengaged and is configured to adopt a coupled state in which the output of the electric motor is coupled in terms of rotation and transmits a rotational movement to the input of the transmission system, in addition to an uncoupled state in which the output of the electric motor is no longer coupled to the input of the transmission system and no longer transmits any rotational movement thereto.

According to a further feature, the coupling system is configured to pass from the coupled state to the uncoupled state as soon as a torque transmitted via the coupling system exceeds a given threshold or is no longer within a given range.

According to a further feature, the coupling system comprises a freewheel which is configured to adopt a state which is coupled in terms of rotation and in which the first coupling shaft is coupled in terms of rotation and transmits a rotational movement to the second coupling shaft, in addition to an uncoupled state in which the first coupling shaft is no longer coupled in terms of rotation to the second coupling shaft and no longer transmits any rotational movement thereto.

A further subject of the invention is an aircraft comprising at least one propulsion unit according to one of the preceding features.

BRIEF DESCRIPTION OF THE DRAWINGS

Further features and advantages will be found in the following description of the invention, the description being provided solely by way of example and with reference to the accompanying drawings, in which.

DETAILED DESCRIPTION OF THE PREFERRED EMBODIMENTS

Figure 1:
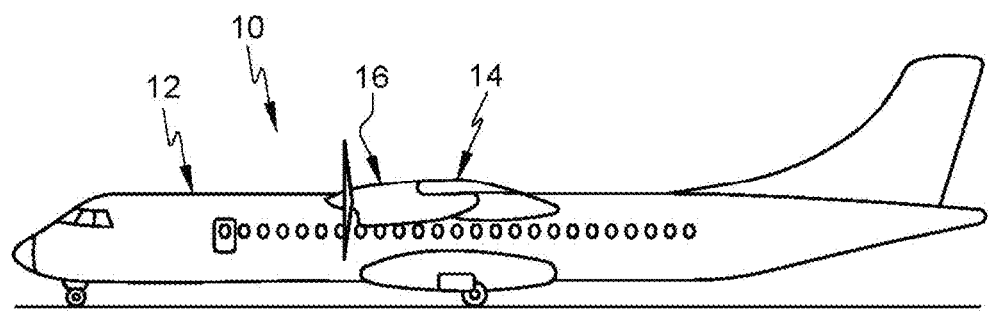
FIG. 1 is a lateral view of an aircraft.
Figure 2:
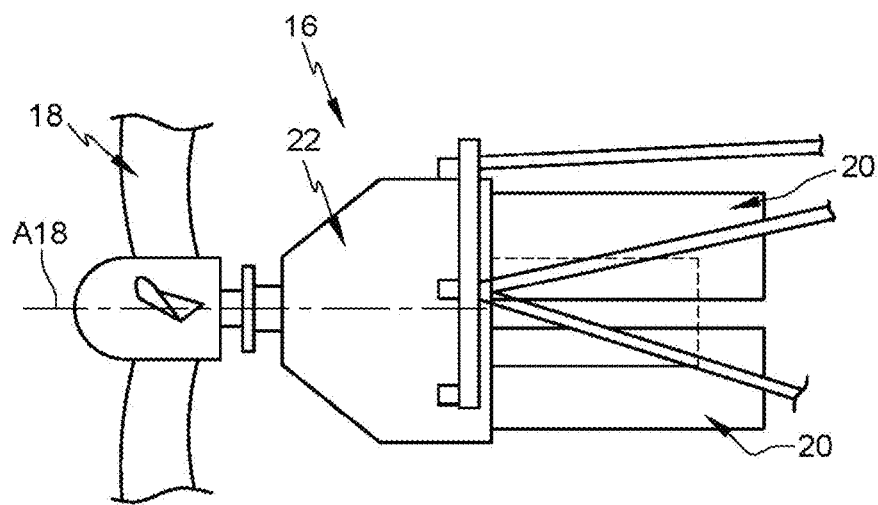
FIG. 2 is a lateral schematic view of an electric propulsion unit illustrating an embodiment of the prior art.
Figure 3:
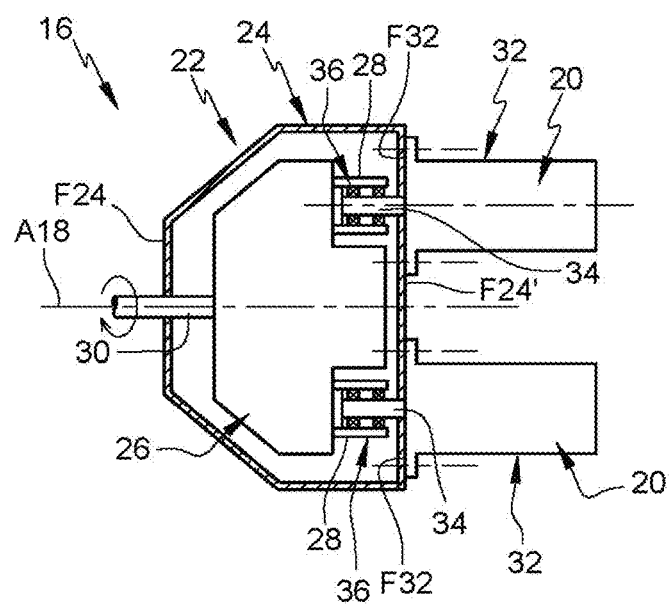
FIG. 3 is a schematic cross section of a transmission system and electric motors of a propulsion unit illustrating an embodiment of the prior art.
Figures 4, 5:
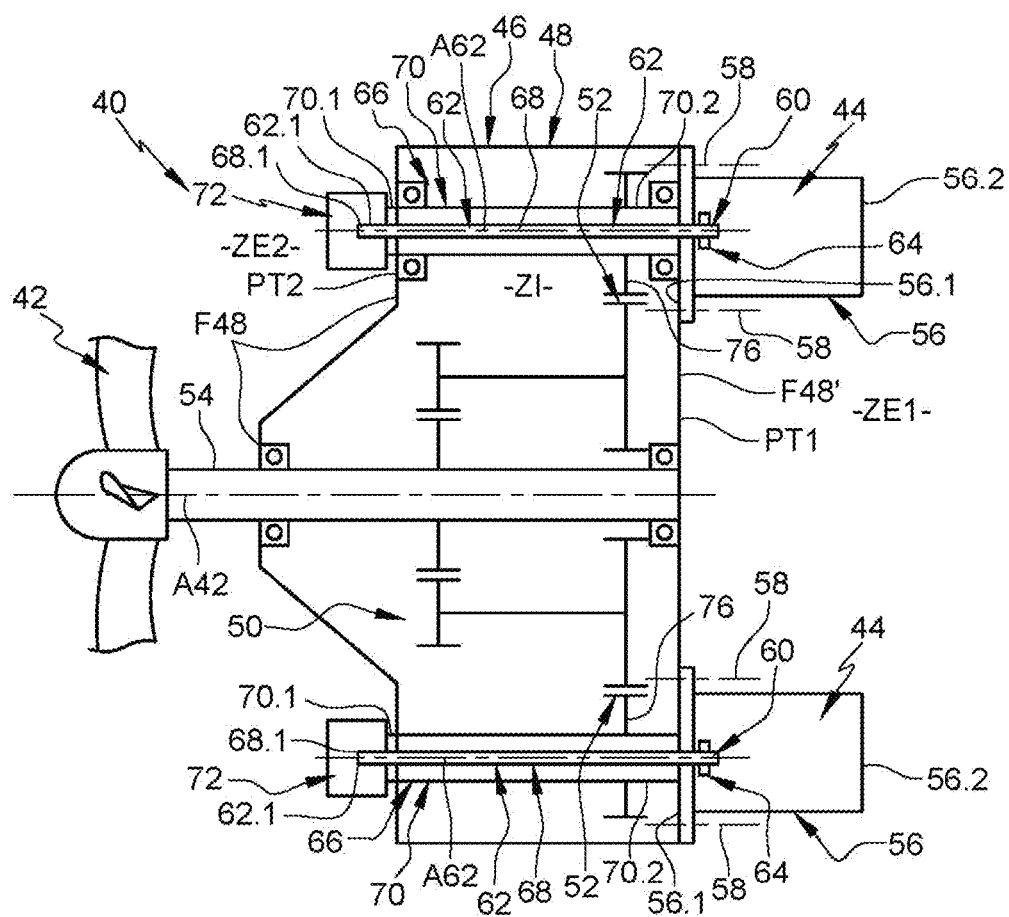
FIG. 4 is a schematic cross section of a part of a propulsion unit illustrating an embodiment.
FIG. 5 is a cross section of a part of a transmission system of an electric motor and a coupling system illustrating an embodiment of the invention.

According to one embodiment which can be seen in FIG. 4, a propulsion unit 40 of the electrical type comprises a propeller 42 which has an axis of rotation A42, a plurality of electric motors 44, in addition to a transmission system 46, such as a gear box for example, which is configured to couple the electric motors 44 to the propeller 42.

According to one application, an aircraft comprises at least one such propulsion unit 40. Naturally, the invention is not limited to this application. Whatever the application, the propulsion unit 40 of the electrical type comprises a propulsion system, such as a propeller for example, a plurality of electric motors 44, in addition to a transmission system 46 which is configured to couple the electric motors 44 to the propulsion system.

According to a configuration which can be seen in FIG. 4, the transmission system 46 comprises a first housing 48 which has in the longitudinal direction a front wall F48 which is oriented toward the propulsion system and a rear wall F48' to which the electric motors 44 are fixed, in addition to at least one kinematic chain 50 which is positioned in the first housing 48 and which has at least one input 52 for each electric motor 44 and an output 54, in the form of an output shaft, passing through the front wall F48 in order to be coupled to the propulsion system. According to a configuration which can be seen in FIG. 4, the input 52 of the transmission system 46 is a pinion. Naturally, the invention is not limited to this embodiment. Thus the input 52 of the transmission system 46 could be a hollow shaft or any other element permitting a coupling and the transmission of a rotational movement.

Each electric motor 44 comprises a second housing 56 which has a first face 56.1 which is oriented toward the transmission system 46, in addition to a second face 56.2 which opposes the first face 56.1 and the transmission system 46. For each electric motor 44, the propulsion unit 40 comprises connecting elements 58 enabling the electric motor 44 to be fixed to the first housing 48 of the transmission system 46. By way of example, the connecting elements 58 are screws which pass through lugs fixed to the second housing 56 of the electric motor 44, each being screwed into a tapped hole fixed to the first housing 48 of the transmission system 46. Naturally, the invention is not limited to this embodiment for the connecting elements 58.

According to one arrangement, at least one electric motor 44 is positioned against the rear wall F48' of the first housing 48 of the transmission system 46 and is connected to the rear wall F48' by the connecting elements 58.

According to a further arrangement, at least one electric motor 44 is positioned against the front wall F48 of the first housing 48 of the transmission system 46 and is connected to the front wall F48 by connecting elements 58.

Whatever the arrangement, the transmission system (more particularly its first housing 48) comprises a first transverse wall PT1 from amongst the front and rear walls F48, F48', in addition to a second transverse wall PT2 which is different from the first transverse wall PT1, from amongst the front and rear walls F48, F48'. The first and second transverse walls PT1, PT2 delimit an internal zone ZI which is located between the first and second transverse walls PT1, PT2, a first external zone ZE1 which is separated from the internal zone ZI by the first transverse wall PT1, in addition to a second external zone ZE2 which is separated from the internal zone ZI by the second transverse wall PT2. At least one electric motor 44 is connected to the first transverse wall PT1 and is positioned in the first external zone ZE1, said electric motor 44 having an output 60 which is coupled to an input 52 of the transmission system 46 which is positioned in the internal zone ZI.

Each electric motor 44 comprises an output 60, such as an output shaft 62 for example, which is connected to the second housing 56 by a pivoting connection 64 which has a pivot axis A62.

According to one arrangement, the pivot axis A62 of the output shaft 62 is substantially parallel to the longitudinal direction. The first and second faces 56.1, 56.2 are substantially perpendicular to the pivot axis A62 and offset to one another in the longitudinal direction.

According to a configuration which can be seen in FIG. 4, the output shaft 62 extends from the first face 56.1, passes through the transmission system 46, in particular the front and rear walls F48, F48' of the first housing 48, and has a free end 62.1 protruding relative to the front wall F48 and offset to the front relative to said front wall F48.

According to a further configuration which can be seen in FIG. 5, the output shaft 62 is hollow and offset to the rear relative to the first face 56.1 of the second housing 56 and the rear wall F48' of the first housing 48.

Naturally, the output 60 of the electric motor 44 is not limited to these configurations. Thus the output 60 of the electric motor 44 could be a pinion or any other element permitting a coupling and the transmission of a rotational movement.

The propulsion unit 40 comprises at least one coupling device 66 connecting the output 60 of one of the electric motors 44 located in the first external zone ZE1 and the input 52 of the transmission system 46, and configured to transmit a rotational movement between the output 60 and the input 52.

This coupling device 66 comprises:
- a first coupling shaft 68 which is coupled to the output 60 of the electric motor 44, passing through the first housing 48 and having a first end 68.1 protruding into the second external zone ZE2,
- a second coupling shaft 70 which is coupled to the input 52 of the transmission system 46, passing through at least the second transverse wall PT2 of the first housing 48 and having a first end 70.1 protruding into the second external zone ZE2,
- a coupling system 72 which is configured to couple the first ends 68.1, 70.1 of the first and second coupling shafts 68, 70 in terms of rotation and which is positioned in the second external zone ZE2.

According to one configuration, the propulsion unit 40 comprises a coupling device 66 for each electric motor 44, whether it is positioned in the first external zone ZE1 or in the second external zone ZE2.

The coupling system 72 is able to be disengaged and is configured to adopt a coupled state in which the output 60 of the electric motor 44 is coupled in terms of rotation and transmits a rotational movement to the input 52 of the transmission system 46, in addition to an uncoupled state, in the case of a malfunction for example, in which the output 60 of the electric motor 44 is no longer coupled to the input 52 of the transmission system 46 and no longer transmits any rotational movement thereto. The coupling system 72 passes from the coupled state to the uncoupled state, in the case of a malfunction for example, as soon as a torque transmitted via the coupling system 72 exceeds a given threshold or is no longer within a given range.

In this manner, if the electric motor 44 coupled to the coupling system 72 no longer functions and the output shaft 62 thereof is blocked in terms of rotation, for example, the coupling system 72 makes it possible to isolate the transmission system 46, which remains operational and transmits the rotational movements of the other electric motors to the propulsion system.

According to one embodiment, the coupling system 72 comprises a freewheel 72.1 which is configured to adopt a state which is coupled in terms of rotation and in which the first coupling shaft 68 is coupled in terms of rotation and transmits a rotational movement to the second coupling shaft 70, in addition to an uncoupled state, in the case of a malfunction for example, in which the first coupling shaft 68 is no longer coupled in terms of rotation to the second coupling shaft 70 and no longer transmits any rotational movement thereto.

According to one configuration, the coupling system 72 comprises first and second rotating guides 72.2, 72.3 which are positioned on either side of the freewheel 72.1. This freewheel comprises a ring having an internal surface which cooperates with the first coupling shaft 68, in addition to an external surface which cooperates with the second coupling shaft 70, at least one of the surfaces from amongst the internal and external surfaces being coupled by friction to the first or second coupling shaft 68, 70.

Since the freewheel 72.1 is located outside the first housing 48 of the transmission system 46, dust potentially generated by the friction coupling of the freewheel 72.1 does not contaminate the interior of the transmission system 46, thus limiting the risks of premature damage to the components of the transmission system 46.

In order to obtain a unit which is more compact, for at least one electric motor 44, the second coupling shaft 70 is hollow and is configured to house the first coupling shaft 68. According to one arrangement, the first and second coupling shafts 68, 70 are coaxial.

According to one arrangement, the coupling system 72 is positioned inside the second coupling shaft 70, between the first ends 68.1, 70.1 of the first and second coupling shafts 68, 70, which makes it possible to protect the coupling system.

In addition, the coupling device 66 comprises a plug 74 which is configured to seal the first end 70.1 of the second coupling shaft 70 and which is connected by a releasable connection to the second coupling shaft 70. This embodiment makes it possible to increase the protection of the coupling system 72.

According to a first embodiment which can be seen in FIG. 4, the output shaft 62 of the electric motor 44 and the first coupling shaft 68 of the coupling device 66 form one and the same shaft. This shaft can be hollow or solid.

According to a second embodiment which can be seen in FIG. 5, the output shaft 62 of the electric motor 44 is positioned in the first external zone ZE1 and is separate from the first coupling shaft 68 of the coupling device 66. According to this embodiment, the first coupling shaft 68 comprises a second end 68.2 which is positioned in the first external zone ZE1 and which is coupled to the output shaft 62 of the electric motor 44.

According to one embodiment, the output shaft 62 of the electric motor 44 is hollow and is configured to receive the second end 68.2 of the first coupling shaft 68. By way of example, the second end 68.2 and the output shaft 62 are splined. Other solutions are conceivable for coupling the output shaft 62 of the electric motor 44 and the first coupling shaft 68 of the coupling device 66.

According to one embodiment, the coupling device 66 comprises a pinion 76 which is fixed to the second coupling shaft 70 and is stationary relative thereto, which cooperates with a pinion or a ring gear of the input 52 of the transmission system 46.

According to one arrangement, the propulsion unit 40 comprises a pivoting connection 78 connecting the second coupling shaft 70 and the first housing 48 of the transmission system 46.

According to one embodiment, the second coupling shaft 70 comprises a second end 70.2 which cooperates with the first transverse wall PT1. In addition, the pivoting connection 78 comprises a first rotating guide 78.1, such as a bearing for example, which is interposed between a portion 70.3 of the second coupling shaft 70 and the second transverse wall PT2, in addition to a second rotating guide 78.2, such as a bearing for example, which is interposed between the second end 70.2 of the second coupling shaft 70 and the first transverse wall PT1.

According to a first configuration, all of the electric motors 44 are positioned against the rear wall F48' of the transmission system 46 and each coupling system 72 thereof is positioned upstream of the front wall F48 of the transmission system 46, in the second external zone ZE2 in which the propulsion system is positioned.

According to a further configuration, at least one electric motor 44 is positioned against the front wall F48 of the transmission system 46 and the coupling system 72 which is associated therewith is positioned downstream of the rear wall F48'.

Whatever the embodiment, the coupling system 72 is positioned outside the first housing 48 of the transmission system 46. As a result, it is no longer necessary to remove the transmission system 46 and to dismantle it in order to carry out a maintenance operation of the coupling system 72, which enables the length of time between two maintenance operations of the transmission system 46 to be increased. A more compact unit is able to be obtained by arranging the electric motor 44 and the coupling system 72, which is associated therewith, on either side of the transmission system 46. Moreover, the coupling system 72 is more accessible when it is positioned upstream of the transmission system, which facilitates maintenance operations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion unit comprising:
   a propulsion system,
   at least one electric motor,
   a coupling device, and,
   a transmission system which is coupled to the propulsion system, the transmission system comprising a first transverse wall and a second transverse wall which delimit an internal zone which is located between the first and second transverse walls, a first external zone separated from the internal zone by the first transverse wall, a second external zone separated from the internal zone by the second transverse wall, the at least one electric motor connected to the first transverse wall and positioned in the first external zone, and the at least one electric motor having an output coupled by the coupling device to an input of the transmission system which is positioned in the internal zone,
   wherein the coupling device comprises:
      a first coupling shaft which is coupled to the output of the electric motor, passing through the transmission system and having a first end protruding into the second external zone,
      a second coupling shaft which is coupled to the input of the transmission system, passing through at least the second transverse wall and having a first end protruding into the second external zone,
      a coupling system which is configured to couple the first ends of the first and second coupling shafts in terms of rotation and which is positioned in the second external zone
      wherein the second coupling shaft is hollow and is configured to house the first coupling shaft.

2. The propulsion unit as claimed in claim 1, wherein the first and second coupling shafts are coaxial.

3. The propulsion unit as claimed in claim 1, wherein the coupling system is positioned inside the second coupling shaft.

4. The propulsion unit as claimed in claim 3, wherein the coupling device comprises a plug configured to seal the first end of the second coupling shaft and connected by a releasable connection to the second coupling shaft.

5. The propulsion unit as claimed in claim 1, wherein the at least one electric motor comprises an output shaft passing through the transmission system, and
   wherein the output shaft and the first coupling shaft form one and the same shaft.

6. The propulsion unit as claimed in claim 1, wherein the at least one electric motor comprises an output shaft positioned in the first external zone, and
   wherein the first coupling shaft and the output shaft are two separate shafts, the first coupling shaft comprising a second end which is positioned in the first external zone and coupled to the output shaft of the electric motor.

7. The propulsion unit as claimed in claim 1, wherein the second coupling shaft comprises a second end which cooperates with the first transverse wall, and
   wherein the propulsion unit further comprises
      a pivoting connection comprising a first rotating guide interposed between a portion of the second coupling shaft and the second transverse wall, and
      a second rotating guide interposed between the second end of the second coupling shaft and the first transverse wall.

8. The propulsion unit as claimed in claim 1, wherein the propulsion system is positioned in the second external zone.

9. The propulsion unit as claimed in claim 1, wherein the coupling system is configured to be disengaged and is configured to adopt a coupled state in which the output of the electric motor is coupled in terms of rotation and transmits a rotational movement to the input of the transmission system and to adopt an uncoupled state in which the output of the electric motor is no longer coupled to the input of the transmission system and no longer transmits any rotational movement thereto.

10. The propulsion unit as claimed in claim 9, wherein the coupling system is configured to pass from the coupled state to the uncoupled state as soon as a torque transmitted via the coupling system exceeds a given threshold or is no longer within a given range.

11. The propulsion unit as claimed in claim 1, wherein the coupling system comprises a freewheel configured to adopt a state which is coupled in terms of rotation and in which the first coupling shaft is coupled in terms of rotation and transmits a rotational movement to the second coupling shaft, and to adopt an uncoupled state in which the first coupling shaft is no longer coupled in terms of rotation to the second coupling shaft and no longer transmits any rotational movement thereto.

12. An aircraft comprising:
    at least one propulsion unit as claimed in claim 1.

\* \* \* \* \*